United States Patent [19]
Hoogendoorn et al.

[11] Patent Number: 5,805,372
[45] Date of Patent: Sep. 8, 1998

[54] POSITIONING OF A HEAD RELATIVE TO A PLURALITY OF TRACKS

[75] Inventors: Abraham Hoogendoorn; Johannes J. W. Kalfs, both of Eindhoven, Netherlands

[73] Assignee: U.S. Philip Corporation, New York, N.Y.

[21] Appl. No.: 759,668

[22] Filed: Dec. 6, 1996

[30] Foreign Application Priority Data

Dec. 7, 1995 [EP] European Pat. Off. ............... 95203380

[51] Int. Cl.$^6$ ........................................................ G11B 5/58
[52] U.S. Cl. .................................... 360/77.01; 360/77.12; 360/78.02
[58] Field of Search ............................ 360/77.12, 77.14, 360/78.02, 77.07, 78.12, 77.01

[56] References Cited

U.S. PATENT DOCUMENTS

| | | | |
|---|---|---|---|
| 4,318,141 | 3/1982 | Haynes | 360/77 |
| 4,472,750 | 9/1984 | Klumpp et al. | 360/78.01 |
| 4,586,094 | 4/1986 | Chambors et al. | 360/77.12 X |
| 4,903,151 | 2/1990 | Mizukami | 360/78.02 X |
| 5,121,270 | 6/1992 | Alcudia et al. | 360/77.12 X |
| 5,379,165 | 1/1995 | Pahr | 360/77.12 X |
| 5,457,586 | 10/1995 | Solhjell | 360/77.04 |
| 5,488,525 | 1/1996 | Adams et al. | 360/77.12 X |

FOREIGN PATENT DOCUMENTS

| | | |
|---|---|---|
| 0629999A2 | 12/1994 | European Pat. Off. |
| 0629999A3 | 12/1994 | European Pat. Off. |
| 0630000A2 | 12/1994 | European Pat. Off. |
| 0630000A3 | 12/1994 | European Pat. Off. |
| 0630001A2 | 12/1994 | European Pat. Off. |
| 0630001A3 | 12/1994 | European Pat. Off. |

*Primary Examiner*—Aristotelis M. Psitos
*Assistant Examiner*—K. Wong

[57] ABSTRACT

An apparatus is disclosed for positioning a head relative to a plurality of tracks running parallel to each other in their longitudinal direction on a record carrier. The apparatus comprises a position detection unit for detecting the position of the head in a transverse direction, which has an output for supplying a first and a second position signal when the head is positioned onto each of two tracks. A memory is present for storing the first and second position signals. In a calibration mode of operation, a control signal generator generates a control signal to position the head onto one of the tracks and the memory stores the position signal generated by the position detection means. The control signal generator subsequently generates a second control signal so as to position the head onto the other track. The memory stores the second position signal generated by the position detection means. These position signals are recalled from memory when the apparatus switches from one track to the other, to effect an immediate positioning of the head to the desired track.

20 Claims, 3 Drawing Sheets

POSITIONING OF A HEAD RELATIVE TO A PLURALITY OF TRACKS

BACKGROUND OF THE INVENTION

1. Field of the Invention

The invention relates to an apparatus for positioning a head relative to a plurality of tracks running parallel to each other in their longitudinal direction on a record carrier, first and second tracks of said plurality of tracks having first and second tracking signals recorded in them, third and fourth tracks of said plurality of tracks having third and fourth tracking signals recorded in them, the apparatus comprising means for reading the first, second, third and fourth tracking signals from said first, second, third and fourth tracks respectively, control signal generator means for generating a first control signal in response to the first and second tracking signals read from the record carrier and for generating a second control signal in response to the third and fourth tracking signals read from the record carrier, positioning means for moving the head in a direction transverse to said longitudinal direction, the positioning means having an input for receiving said first and second control signals and for moving the head in response to said first and second control signals, in such a way in said transverse direction that the head is positioned onto a fifth and sixth track respectively, to a recording apparatus for recording an information signal on said record carrier and to a reproducing apparatus for reproducing an information signal from said record carrier.

2. Description of the Related Art

An apparatus as defined in the opening paragraph is known from U.S. Pat. No. 4,318,141, document D1 in the list of related documents given at the end of this specification, and is applied in a recording apparatus for recording an information signal in the fifth and sixth tracks on the record carrier, or in a reproducing apparatus for reproducing the information signal from the fifth and sixth tracks on the record carrier.

Tracking signals are prerecorded deeply in tracks lying parallel to each other on the record carrier. In a later recording step, an information signal is recorded in the fifth track which lies half over the first track and half over the second track. When the fifth track has been completely filled with information and the head has reached one end of the said track, the head is switched over to another track, such as the sixth track for the recording of information in said sixth track. The sixth track lies half over the third track and half over the fourth track. The second track and the third track may be the same track, so that the fifth and sixth track are located directly adjacent to each other on the record carrier. In a later reproduction step, the information signal can be read from the fifth and sixth tracks, by positioning the head on said fifth and sixth tracks.

The invention aims at providing an improved head positioning apparatus. The apparatus in accordance with the invention is characterized in that the apparatus further comprises position detection means for detecting the position of the head in said transverse direction, having an output for supplying a first and a second position signal when the head is positioned onto said fifth and sixth track respectively, memory means for storing said first and second position signals, that in a calibration mode of operation, the control signal generator means are adapted to generate the first control signal in response to said first and second tracking signals so as to position the head onto said fifth track, the memory means are adapted to store the first position signal generated by said position detection means, the control signal generator means are further adapted to subsequently generate the second control signal in response to said third and fourth tracking signals so as to position the head onto said sixth track, the memory means being adapted to subsequently store the second position signal generated by said position detection means.

SUMMARY OF THE INVENTION

The invention is based on the following recognition. Switching over of the head from one track (such as the fifth track) to another track (such as the sixth track) means that the head needs to be repositioned in the direction transverse to the tracks. Especially in the situation where the fifth and the sixth track are not adjacent to each other, the head has to cross one or more tracks in a coarse repositioning step before it reaches the sixth track. Next, after being positioned coarsely on the sixth track, the third and fourth tracking signals recorded in the third and fourth tracks can be detected so that, in a fine repositioning step following the coarse repositioning step, the head can be positioned on the sixth track using the second control signal generated from the read out third and fourth tracking signals. In prior art head positioning apparatuses, the repositioning of the head may require a relatively long time interval before the head is finally positioned on the sixth track.

In accordance with the invention, in a calibration mode of operation, the positions of the fifth and sixth tracks are determined and position signal corresponding to those positions are stored in the memory, so that in the coarse repositioning step, the position signals stored in the memory can be used to quickly and accurately position the head on the sixth track.

One could detect the positions of only two tracks, such as the two outermost tracks in which an information signal is (or will be) recorded. The positions of intermediate tracks can then be obtained using interpolation. On the other hand, the positions of all the tracks in which an information signal is (or will be) recorded can be detected in the calibration mode and the corresponding position signals stored in the memory.

Further, tracking during recording or reproduction can be improved by dynamically controlling the position of the head not only using the tracking signal, but also using a difference signal which has a relationship with the difference between each time two subsequent sample values of the position signal supplied by the position detection means when the head is positioned onto a specific track.

BRIEF DESCRIPTION OF THE DRAWING

These and other aspects of the invention will be apparent from and further elucidated with reference to the embodiments described in the following figure description, in which.

DETAILED DESCRIPTION OF THE PREFERRED EMBODIMENTS

Figure 1:
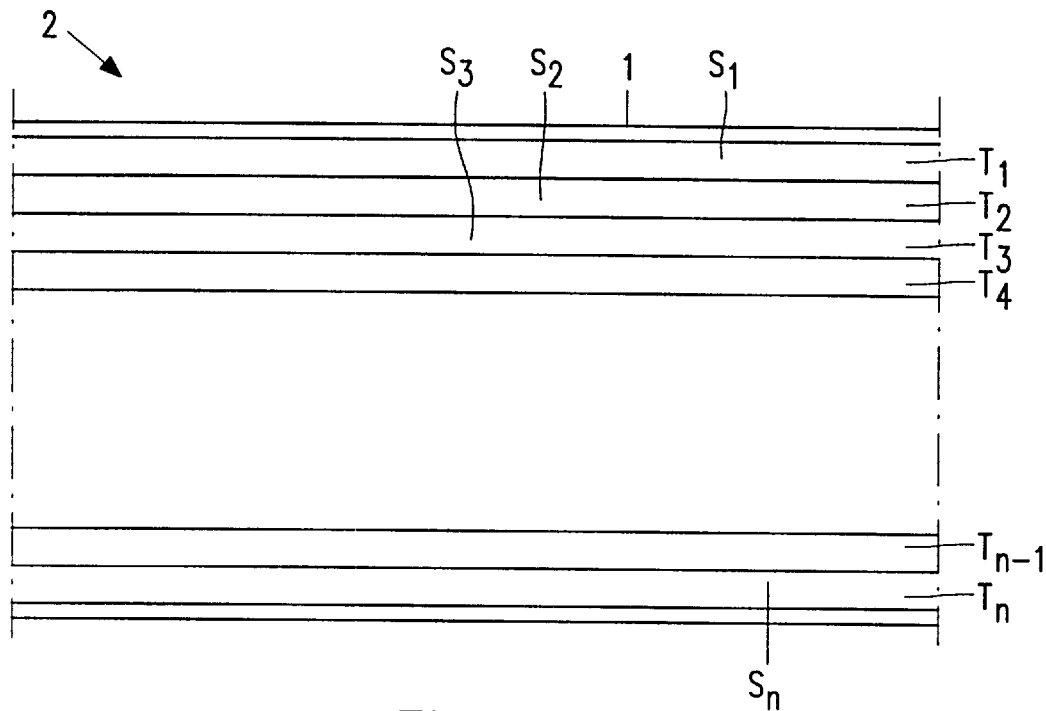
FIG. 1 shows an embodiment of the record carrier provided with tracking signals.

FIG. 1 shows an embodiment of a record carrier 2. Only a part of the record carrier is shown. On the record carrier 2, tracks $T_1, T_2, \ldots, T_{n-1}, T_n$ are present. The tracks run parallel to each other in their longitudinal direction. A first tracking signal $s_1$ has been recorded in the track $T_1$. A second tracking signal $s_2$ has been recorded in the track $T_2$. A third tracking signal $s_3$ has been recorded in the track $T_3$. An n-th tracking signal $s_n$ has been recorded in the track $T_n$.

The tracking signals are signals of relatively low frequency, compared to the frequency components of the information signal that will be recorded later on the record carrier. As the frequency of the tracking signals is relatively low, those tracking signals will be (have been) recorded deeply in the record carrier so that a later recording of the information signal will not result in an erasing of the tracking signals. The tracking signals in two neighbouring tracks may have different frequencies. Preferably, however, the tracking signals have the same frequency and tracking signals in neighbouring tracks have a different phase. More specifically, the phase difference between the tracking signals of adjacent tracks is 180°.

The tracks are shown, lying side-by-side, without a guard band between the tracks. A guard band may however be present between the tracks. The guard band may be so broad that the data tracks comprising the recorded information signal fit in between two neighbouring tracks comprising tracking signals.

Figure 2:
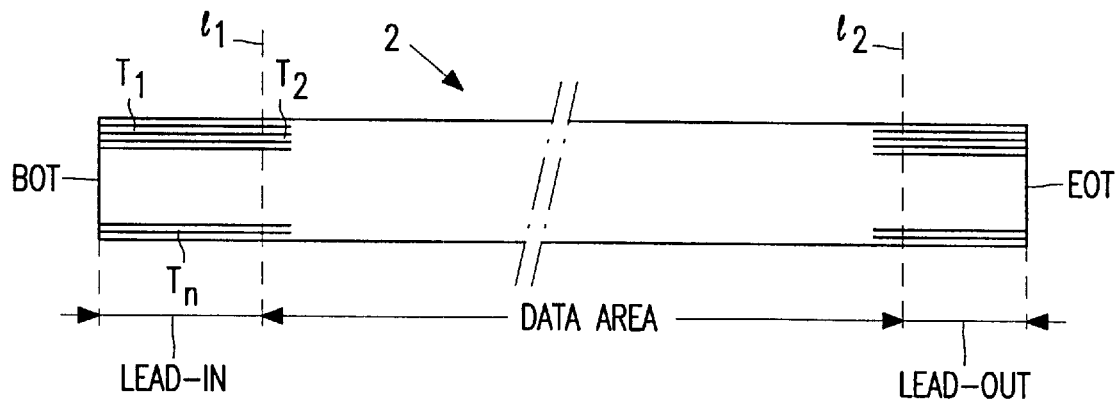
FIG. 2 shows schematically the record carrier over its total length.

FIG. 2 shows the record carrier 2 again, now schematically over its total length. The start end of the record carrier 2 is indicated by BOT (beginning-of-tape) and the final end is indicated by EOT (end-of-tape). A lead-in portion and a lead-out portion are shown, being the portions between the start end (BOT) of the record carrier and the line $1_1$ and the final end (EOT) of the record carrier and the line $1_2$ respectively. A data area for recording the information signal is available between the lead-in portion and the lead-out portion of the record carrier 2.

Figure 3:
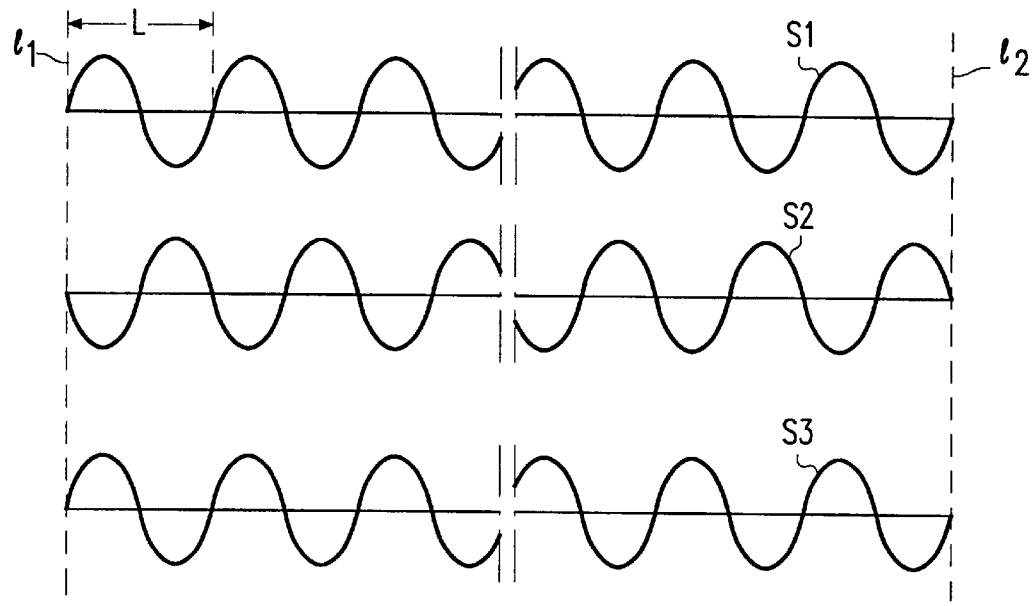
FIG. 3 shows an example of the tracking signals as recorded in the tracks.

FIG. 3 shows an example of the tracking signals $S_1$, $S_2$ and $S_3$ as recorded in the data area portion between the lines $1_1$ and $1_2$ of the tracks $T_1$, $T_2$ and $T_3$ respectively. FIG. 3 shows a tracking signal in the track $T_1$ in the form of a sinusoid having a specific frequency and wavelength L. The duty cycle of the sinusoid is ½ as usual for a normal sinusoid. The duty cycle may however be different from ½.

FIG. 3 further shows the tracking signal $S_2$ in the form of a sinusoid having a specific frequency and wavelength, which are in this example equal to the frequency and the wavelength respectively of the tracking signal $S_1$. The tracking signal $S_2$ differs from the tracking signal $S_1$, in that its phase differs by 180° from the phase of the tracking signal $S_1$. In other words: the tracking signal $S_2$ differs in polarity from the tracking signal $S_1$. FIG. 3 also shows the tracking signal $S_3$ in the form of a sinusoid having a specific frequency and wavelength, which are in this example also equal to the frequency and the wavelength respectively of the tracking signal $S_1$. The tracking signal $S_3$ differs from the tracking signal $S_2$, in that its phase differs by 180° from the phase of the tracking signal $S_2$. In other words: the tracking signal $S_3$ differs in polarity from the tracking signal $S_2$, and is thus equal to the tracking signal $S_1$.

Figure 4:
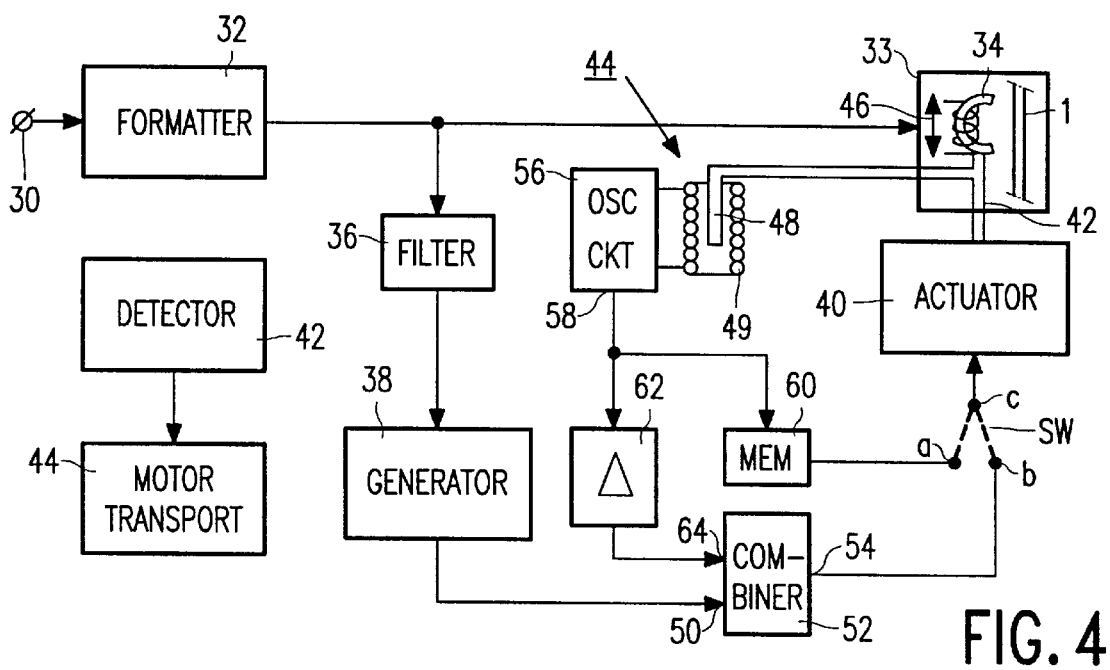
FIG. 4 shows an example of a recording apparatus comprising an embodiment of the positioning apparatus.
Figure 5:
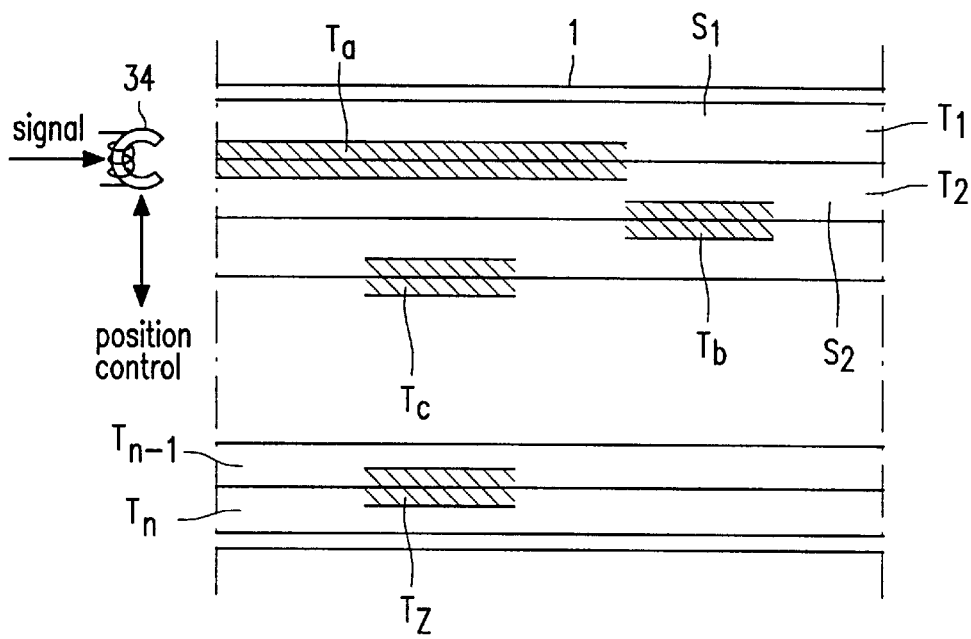
FIG. 5 shows the record carrier having information tracks recorded on it.

FIG. 4 shows an embodiment of an apparatus for recording an information signal on the record carrier 1 of FIG. 1 and 2, which has the tracking signals shown in FIG. 3 prerecorded on it. FIG. 5 shows how the information signal is recorded on the record carrier 1. A track $T_a$ is recorded exactly on the boundary line between two adjacent tracks of tracking signals, such as the tracks $T_1$, and $T_2$. A track $T_b$ is recorded exactly on the boundary line between two adjacent tracks $T_2$ and $T_3$ of tracking signals. A track $T_z$ is recorded exactly on the boundary line between two adjacent tracks $T_{n-1}$ and $T_n$ of tracking signals. The apparatus of FIG. 4 has an input terminal 30 for receiving the information signal. The input terminal is coupled to an input of a formatter unit 32, which converts the information signal into a format suitable for recording on the record carrier 1. An output of the formatter unit 32 is coupled to a write unit 33 comprising a write/read head 34. The formatted information signal is supplied to the write/read head 34 and recorded in one of the tracks $T_a, T_b, \ldots T_z$ on the record carrier 1. The record carrier as shown in FIG. 4 is supposed to be transported in a direction perpendicular to the plane of the drawing. The record carrier 1 is shown in FIG. 4 over only part of its width.

The head 34 is further adapted to read the tracking signals recorded in the tracks $T_1$ and $T_2$. The tracking signals are supplied to a filter unit 36, which has a bandpass filter characteristic with a centre frequency equal to the specific frequency of the tracking signals. As the frequency of the tracking signals is low relative to the frequency content of the formatted information signal, it is possible to read the tracking signals from two adjacent tracks, such as $T_1$ and $T_2$, while writing the formatted information signal into the track $T_a$.

A generator unit 38 is present for generating a control signal in response to the 30 tracking signals read by the head 34. This control signal is supplied to an input 50 of a control signal combining unit 52. An output 54 of the combining unit 52 is coupled to a terminal b of a switch SW, which has a terminal c coupled to an input of an actuator unit 40. The actuator unit 40 actuates a movable mounting 42 on which the head 34 is mounted. The movable mounting can have any form. One preferred embodiment of a mounting is described in EP patent application no. 95202926.2, document D2 of the list of related documents, filed recently in the name of applicant, but not yet published. Where necessary, this EP patent application is considered to be incorporated by reference in the present application.

The recording apparatus comprises a position detector 44 for detecting the position of the head 34 in a direction transverse to the tracks, that is: in the direction given by the arrow 46. The position detector 44 has an elongated member 48 of magnetic material, such as ferrite, which is rigidly coupled to the movable mounting 42. The elongated member 48 is positioned inside the windings of a stationary inductance 49. The two terminals of the inductance 49 are coupled to an oscillator circuit 56. The oscillator circuit 56 oscillates with a frequency which is dependent of the inductance value of the inductance 49 and supplies an output signal at its output 58 which has a relation to the frequency of the oscillator circuit 56. When the head 34 moves in the direction transverse to the tracks, the elongated member 48 moves and penetrates further into, or is moved outwardly from the windings of the inductance 49. As a consequence, the oscillator frequency of the oscillator circuit 56 changes. As a result, the output signal of the oscillator circuit 56 has thus a relation to the position of the head 34, viewed in the transverse direction of the tracks.

The output 58 of the oscillator circuit 56 is coupled to an input of a memory 60 as well as to an input of a difference circuit 62. An output of the memory 60 is coupled to the terminal a of the switch SW, and the output of the difference circuit 62 is coupled to a second input 64 of the combining unit 52.

First, the positioning of the head 34 onto a track, based on the tracking signals alone, will be explained. That means that the switch SW is assumed to be in its position b-c and that the control loop via the oscillator circuit 56 and memory 60 is inactive.

When the head 34 is located exactly half way on the tracks $T_1$ and $T_2$, tracking signals of equal amplitude but opposite phase are read from the tracks $T_1$ and $T_2$. As a result, a substantially zero amplitude signal is supplied by the filter 36 to the generator unit 38. The generator unit 38 supplies a control signal to the actuator unit 40 in response to the signal applied by the filter 36. In the situation described above, where the head is positioned exactly half way on the two tracks $T_1$ and $T_2$, no repositioning of the head 34 is required. If the head is positioned for a larger part on the track $T_1$, the tracking signal read from the track $T_1$ will have a larger amplitude than the signal read from the track $T_2$. This means that a non-zero amplitude signal will be supplied by the filter 36 to the generator unit 38. The generator unit 38 now generates a control signal for the actuator unit 40, such that the head 34 is moved in a specific direction towards a position leading to an decrease in amplitude of the signal applied by the filter 36 to the generator 38.

If the head 34 is positioned for a larger part on the track $T_2$, the tracking signal read from the track $T_2$ will have a larger amplitude than the signal read from the track $T_1$. This means that, again, a non-zero amplitude signal will be supplied by the filter 36 to the generator unit 38. The generator unit 38 now generates a control signal for the actuator unit 40, such that the head 34 is moved in the other direction towards a position leading to an decrease in amplitude of the signal applied by the filter 36 to the generator 38.

Next, the calibration mode of operation of the apparatus will be described. Upon activating the calibration mode, such as in the situation where a record carrier is inserted into the apparatus, the motor (not shown) for transporting the record carrier is switched into its nominal transport speed to transport the record carrier past the head 34, and the head 34 is moved with a uniform movement in the transverse direction from one edge of the record carrier 1 to the other edge. A central processing unit (not shown), included in the apparatus, is capable of detecting the moments when the head is positioned exactly on a boundary between two adjacent ones of the tracks $T_1$ to $T_n$. Upon such detection, the central processing unit supplies a load signal (not shown) to the memory 60, so that the position signal present at the output 58 of the oscillator circuit 56 at the moment of detection is stored in the memory. In this way, position signals for all of the boundaries between all two adjacent ones of the tracks $T_1$ to $T_n$ can be stored in the memory. In this realization, the memory 60 has storage locations for storing at least the n−1 position signals for the n−1 boundaries between the tracks $T_1$ to $T_n$.

In another realization of the calibration mode, the head 34 is positioned on the boundaries between the tracks $T_1$ and $T_2$ and between the tracks $T_{n-1}$ and $T_n$ only, so that the position signals corresponding to those boundaries are stored in the memory 60. In an interpolation step, the position signals can be calculated from the two position signals of the outermost tracks $T_a$ and $T_z$ by means of an interpolation algorithm and stored in the memory 60 as well. Or, the position signal for an intermediate track, such as the track $T_b$, is calculated in real time, if a positioning on said track is required for positioning the head onto said track.

Next, the recording mode of operation will be described. An information signal to be recorded, which may be a data signal, is supplied to the input terminal 30. The formatter unit 32 converts the information signal into signal blocks comprising portions of he information signal. Generally, the formatter unit further comprises a channel encoder, well known in the art, for channel encoding the information signal. Subsequent signal blocks of information are thus supplied to the head 34 and recorded in the track $T_a$. The switch SW is switched into its position b-c. Tracking signals are generated by the filter 36, in the way as explained above, and an output signal in response to those tracking signals is generated by the generator 38 and supplied to the input 50 of the combining unit 52. Further, the position signal is supplied to the difference circuit 62. The difference circuit 62 samples values of the position signal at regular time instants and calculates the difference between each time two successive sample values of the position signal. The circuit 62 supplies an output signal which is proportional to said difference to the input 64 of the combining circuit 52. The combining circuit 52 combines the output signals of the generator 38 and the difference circuit 62 and generates a control signal at its output 54, which is supplied to the actuator 40.

The (additional) control loop, given by the oscillator circuit 56 and the difference circuit 62, is present in order to stabilize the control characteristic of the actuator 40. The additional control loop uses the position detector 44 to generate a velocity control signal in a relatively wide frequency band, for controlling the actuator 40. As a result, a satisfactory suppression of external vibrations can be realized.

When switching over to another track, the switch SW is switched into its position a-c, so that a coarse control of the head towards the position onto the new track can be realized. As soon as the new track has been reached, the control loop is restored by changing the switch position of the switch SW from the position a-c to the position b-c, so that a fine control can be realized to position the head exactly on the track.

When recording the information signal in the track $T_a$, the record carrier is transported by the motor transport unit 44. A detector unit 42 is present to detect the end of a track, so that the switching over towards another track can be triggered.

After having recorded the information signal in the track $T_a$, and having reached the end of the track $T_a$, the detector unit 42 generates a control signal, which is supplied to the motor transport unit 44 as well as to the central processing unit (not shown). In response to this detection, the head 34 is positioned on the boundary line between the tracks $T_2$ and $T_3$, so that a track $T_b$ comprising the recorded information signal, see FIG. 5, can be recorded on the record carrier. The record carrier is now transported in opposite direction compared to the direction of transport when recording the information signal in the track $T_a$.

Upon reaching the other end of the record carrier, the motor transport unit 44 will either stop the transport of the record carrier, or reverse the transport direction of the record carrier 1. In the latter case, the head 34 will be positioned on another track. As an example, after having recorded the information signal in the track $T_b$, the head 34 is positioned on the boundary line between the tracks $T_3$ and $T_4$, so that a track $T_c$ comprising the recorded information signal, see FIG. 5, can be recorded on the record carrier.

The circuit diagram of FIG. 4 can also be used to shortly discuss an apparatus for reproducing an information signal that has been recorded in the tracks $T_a$ to $T_z$ on the record carrier 1. Instead of a formatter unit 32, the reproducing apparatus comprises a deformatter unit to reconvert the channel signal read from the record carrier by means of the head 34 into a replica of the original information signal. The tracking control as described above with reference to the recording apparatus is fully the same for the reproducing apparatus. Thus, when carrying out the calibration mode, position signals are stored in the memory 60. When switching over from the reproduction of information from one track to reproduction from another track, the switch SW is placed in its position a-c. During the reproduction mode, the switch SW is placed in its position b-c, so that two servo loops are present for realizing the positioning of the head onto a track to be read.

Figure 6:
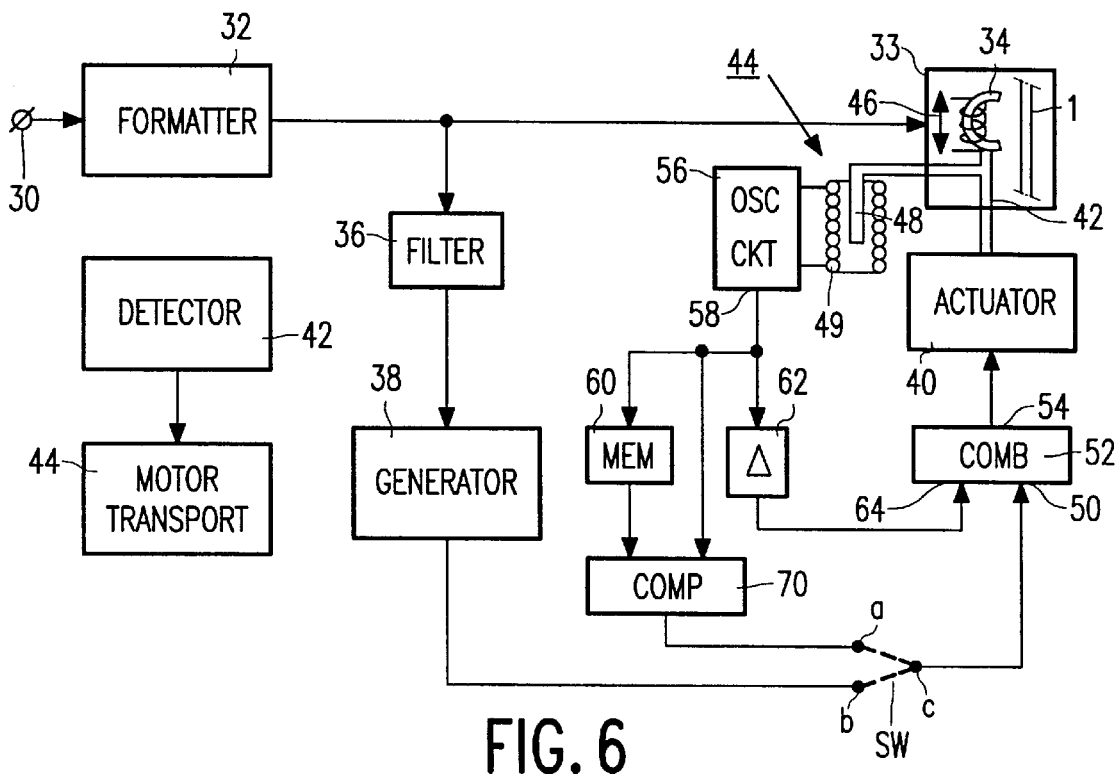
FIG. 6 shows another embodiment of the apparatus in accordance with the invention.

FIG. 6 shows another embodiment of the positioning apparatus incorporated in a recording and/or reproducing apparatus. The apparatus shown in FIG. 6 shows a large resemblance with the apparatus of FIG. 4. The position control loops in FIG. 6 are slightly different from the ones shown in FIG. 4. The switch SW is now located between the generator unit 38 and the signal combining unit 52 and has its terminal b coupled to the output of the generator unit 38 and its terminal c coupled to the input 50 of the signal combining unit 52. Further, an additional comparator unit 70 is present, having a first input coupled to the output of the memory unit 60, a second input coupled to the output 58 of the oscillator circuit and an output coupled to the a-terminal of the switch SW.

In the calibration mode of operation, the switch SW is in its position b-c, so that the positions of the tracks $T_a$ to $T_z$ can be determined and the corresponding position signals stored in the memory 60. The velocity control loop via the oscillator circuit 56 and the difference circuit 62 may be active for stability reasons, as explained previously. In the normal operation mode, during recording and/or reproduction, the switch SW is also in its switch position b-c. During switching over from one track to another, the switch SW is in its position a-c, so as to coarsely position the head on the new track.

Figure 7:
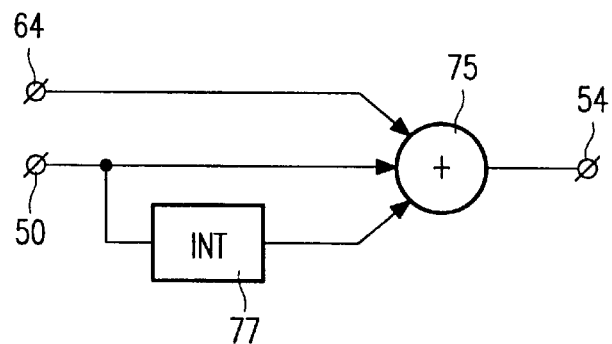
FIG. 7 shows an embodiment of the signal combining unit in the apparatus of the FIGS. 4 and 6.

The signal combining unit may have various circuit constructions. One such circuit construction is shown in FIG. 7. The circuit comprises an adder unit 75 and an integrating unit 77. The inputs 50 and 64 are both coupled to corresponding inputs of the adder unit 75. Further, the input 50 is coupled to the adder unit 75 via the integrator unit 77, so as to realize a PI (proportional-integrating) control.

The invention thus relates to the positioning of a head relative to a track on a record carrier, either during recording or during reproduction.

Whilst the present invention has been described with respect to preferred embodiments thereof, it is to be understood that these are not limitative examples. Thus, various modifications may become apparent to those skilled in the art, without departing from the scope of the invention, as defined in the appended claims. As an example, the record carrier may be one of the longitudinal type, or from the disk type. The tracking signals need not necessarily be sinusoids, but may have a different shape. Further, in the embodiments shown in the FIGS. 4 and 6, the difference circuit 62 could have been replaced by a differentiator unit, assuming the velocity control loop would have been realized completely in analog form.

Other patent applications filed recently in the name of applicant and relating to the positioning of a head relative to a plurality of tracks for recording and reproduction purposes, but not yet published are: EP patent application 95203028.6, document D3 in the list of related documents, EP application no. 95203029.4, document D4 in the list of related documents and EP application no. 95203192.0, document D5 in the list of related documents.

Related documents (D1) U.S. Pat. No. 4,318,141
(D2) EP pat. appln. no. 95202926.2 (PHN 15.520), filing date 30 Oct. 1995
(D3) EP pat. appln. no. 95203028.6 (PHN 15.543), filing date 08 Nov. 1995
(D4) EP pat. appln. no. 95203029.4 (PHN 15.545), filing date 08 Nov. 1995
(D5) EP patent appln. no. 95203192.0 (PHN 15.563)

We claim:

1. Apparatus for positioning a head relative to a plurality of tracks running parallel to each other in their longitudinal direction on a record carrier, first and second tracks of said plurality of tracks having first and second tracking signals recorded in them, third and fourth tracks of said plurality of tracks having third and fourth tracking signals recorded in them, the apparatus comprising means for reading the first, second, third and fourth tracking signals from said first, second, third and fourth tracks respectively, control signal generator means for generating a first control signal in response to the first and second tracking signals read from the record carrier and for generating a second control signal in response to the third and fourth tracking signals read from the record carrier, positioning means for moving the head in a direction transverse to said longitudinal direction, the positioning means having an input for receiving said first and second control signals and for moving the head in response to said first and second control signals, in such a way in said transverse direction that the head is positioned onto a fifth and sixth track respectively, characterized in that the apparatus further comprises position detection means for detecting the position of the head in said transverse direction, having an output for supplying a first and a second position signal when the head is positioned onto said fifth and sixth track respectively, memory means for storing said first and second position signals, that in a calibration mode of operation, the control signal generator means are adapted to generate the first control signal in response to said first and second tracking signals so as to position the head onto said fifth track, the memory means are adapted to store the first position signal generated by said position detection means, the control signal generator means are further adapted to subsequently generate the second control signal in response to said third and fourth tracking signals so as to position the head onto said sixth track, the memory means being adapted to subsequently store the second position signal generated by said position detection means.

2. Apparatus as claimed in claim 1, characterized in that in said calibration mode of operation, the control signal generator means are adapted to generate a third control signal in response to fifth and sixth tracking signals read from a seventh and an eighth track respectively, so as to position the head onto a ninth track, the memory means further being adapted to store a third position signal generated by said position detection means when the head is positioned onto said ninth track.

3. Apparatus as claimed in claim 1, characterized in that calculation means are present for deriving, in said calibration mode of operation, a third position signal for a ninth track lying between the fifth and the sixth track, from the first and second position signals by means of interpolation.

4. Apparatus as claimed in claim 3, characterized in that the memory means is adapted to store said third position signal.

5. Apparatus as claimed in claim 1, characterized in that, in a mode of operation where the head is switched from a track to another track, the memory means are adapted to supply the position signal corresponding to said another track to the positioning means in order to coarsely position the head onto said another track.

6. Apparatus as claimed in claim 5, characterized in that, the control signal generator means are adapted to switch over to a generation of a control signal in response to tracking signals as soon as tracking signals are available after the switching over to said another track.

7. Apparatus as claimed in claim 1, characterized in that the control signal generator means are adapted to generate a control signal in response to tracking signals and in response to a difference signal, said difference signal having a relationship with the difference between two sample values of the position signal supplied by the position detection means when the head is positioned onto a track.

8. Recording and/or reproducing apparatus for recording and/or reproducing an information signal on/from a record carrier, comprising the head positioning apparatus as claimed in claim 1.

9. Apparatus as claimed in claim 2, characterized in that, in a mode of operation where the head is switched from a track to another track, the memory means are adapted to supply the position signal corresponding to said another track to the positioning means in order to coarsely position the head onto said another track.

10. Apparatus as claimed in claim 3, characterized in that, in a mode of operation where the head is switched from a track to another track, the memory means are adapted to supply the position signal corresponding to said another track to the positioning means in order to coarsely position the head onto said another track.

11. Apparatus as claimed in claim 4, characterized in that, in a mode of operation where the head is switched from a track to another track, the memory means are adapted to supply the position signal corresponding to said another track to the positioning means in order to coarsely position the head onto said another track.

12. Apparatus as claimed in claim 9, characterized in that, the control signal generator means are adapted to switch over to a generation of a control signal in response to tracking signals as soon as tracking signals are available after the switching over to said another track.

13. Apparatus as claimed in claim 10, characterized in that, the control signal generator means are adapted to switch over to a generation of a control signal in response to tracking signals as soon as tracking signals are available after the switching over to said another track.

14. Apparatus as claimed in claim 11, characterized in that, the control signal generator means are adapted to switch over to a generation of a control signal in response to tracking signals as soon as tracking signals are available after the switching over to said another track.

15. Apparatus as claimed in claim 5, characterized in that the control signal generator means are adapted to generate a control signal in response to tracking signals and in response to a difference signal, said difference signal having a relationship with the difference between two sample values of the position signal supplied by the position detection means when the head is positioned onto a track.

16. Apparatus as claimed in claim 13, characterized in that the control signal generator means are adapted to generate a control signal in response to tracking signals and in response to a difference signal, said difference signal having a relationship with the difference between two sample values of the position signal supplied by the position detection means when the head is positioned onto a track.

17. Apparatus as claimed in claim 14, characterized in that the control signal generator means are adapted to generate a control signal in response to tracking signals and in response to a difference signal, said difference signal having a relationship with the difference between two sample values of the position signal supplied by the position detection means when the head is positioned onto a track.

18. Recording and/or reproducing apparatus for recording and/or reproducing an information signal on/from a record carrier, comprising the head positioning apparatus as claimed in claim 5.

19. Recording and/or reproducing apparatus for recording and/or reproducing an information signal on/from a record carrier, comprising the head positioning apparatus as claimed in claim 15.

20. Recording and/or reproducing apparatus for recording and/or reproducing an information signal on/from a record carrier, comprising the head positioning apparatus as claimed in claim 16.

* * * * *